(12) United States Patent  
Purushothaman

(10) Patent No.: US 10,430,584 B2  
(45) Date of Patent: Oct. 1, 2019

(54) MULTIPLEXED—PROACTIVE RESILIENCY SYSTEM

(71) Applicant: Bank of America Corporation, Charlotte, NC (US)

(72) Inventor: Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 225 days.

(21) Appl. No.: 15/700,388

(22) Filed: Sep. 11, 2017

(65) Prior Publication Data

US 2019/0080085 A1     Mar. 14, 2019

(51) Int. Cl.

| G06F 11/00 | (2006.01) |
|---|---|
| G06F 12/14 | (2006.01) |
| G06F 12/16 | (2006.01) |
| G08B 23/00 | (2006.01) |
| G06F 21/55 | (2013.01) |
| H04L 29/06 | (2006.01) |

(52) U.S. Cl.
CPC .......... *G06F 21/554* (2013.01); *H04L 63/145* (2013.01); *H04L 63/1425* (2013.01); *G06F 2221/033* (2013.01)

(58) Field of Classification Search
CPC ............... G06F 21/554; G06F 221/033; H04L 63/1425; H04L 63/145
See application file for complete search history.

(56) References Cited

U.S. PATENT DOCUMENTS

| 7,225,343 B1 | 5/2007 | Honig et al. |
|---|---|---|
| 7,913,306 B2 | 3/2011 | Apap et al. |
| 8,938,612 B1 * | 1/2015 | Mittal .................. G06F 21/604 340/501 |

(Continued)

OTHER PUBLICATIONS

"Adware," https://en.wikipedia.org/wiki/Adware, Wikimedia Foundation, Inc., Aug. 11, 2017.

(Continued)

*Primary Examiner* — John B King  
*Assistant Examiner* — Darshan I Dhruv  
(74) *Attorney, Agent, or Firm* — Weiss & Arons LLP; Michael A. Springs, Esq.

(57) ABSTRACT

Methods for machine-learned detection and removal of malicious software within a network are provided. Methods may record environment behavior of an application and a plurality of components. The plurality of components may touch the application. Methods may generate a baseline dataset based on the recorded environment behavior. Methods may schedule snapshots of the application. Methods may take snapshots of the application and the components based on the scheduling. Methods may store the snapshots in a repository. Methods may monitor the application and the components, using the stored snapshots, for any deviation in the environment behavior. Methods may detect a deviation in the behavior of the application or components. Methods may take a snapshot, outside of the scheduling, of the application and components upon detection of the deviation. Methods may determine that the deviation is unwarranted. Methods may revert the application and components back to a previous version.

20 Claims, 3 Drawing Sheets

(56) References Cited

U.S. PATENT DOCUMENTS

| | | | |
|---|---|---|---|
| 9,112,895 B1 | 8/2015 | Lin | |
| 9,450,979 B2 | 9/2016 | Keromytis et al. | |
| 9,516,053 B1* | 12/2016 | Muddu | G06F 16/254 |
| 9,542,535 B1* | 1/2017 | Baumgartner | G06F 21/00 |
| 9,654,485 B1* | 5/2017 | Neumann | H04L 63/1416 |
| 2013/0097706 A1* | 4/2013 | Titonis | G06F 21/56 726/24 |
| 2014/0090072 A1* | 3/2014 | Sankararaman | G06F 21/554 726/26 |
| 2015/0082428 A1* | 3/2015 | Dokey | G06F 21/50 726/22 |
| 2017/0063910 A1* | 3/2017 | Muddu | G06F 16/254 |
| 2017/0230389 A1* | 8/2017 | Cochenour | H04L 63/145 |

OTHER PUBLICATIONS

"Anti-keylogger," https://en.wikipedia.org/wiki/Anti-keylogger, Wikimedia Foundation, Inc., Mar. 4, 2017.
"Browser Helper Object," https://en.wikipedia.org/w/index.php?title=Browser_Helper_Object&oldid=792453664, Wikimedia Foundation, Inc. Jul. 26, 2017.
"Computer Virus," https://en.wikipedia.org/wiki/Computer_virus, Wikimedia Foundation, Inc., Aug. 11, 2017.
"Computer Worm," https://en.wikipedia.org/wiki/Computer_worm, Wikimedia Foundation, Inc., Aug. 11, 2017.
"Keystroke Logging," https://en.wikipedia.org/wiki/keystroko_logging, Wikimedia Foundation, Inc., Aug. 11, 2017.
"Malicious Software (Malware)," https://www.techopedia.com, Retrieved on Aug. 17, 2017.
"MongoDB Atlas—Database as a Service," https://www.mongodb.com, Retrieved on Sep. 11, 2017.
Google Search: "MySQL," Retrieved on Sep. 11, 2017.
"Network Address Translation," https://en.wikipedia.org/wiki/Network_address_translation, Wikimedia Foundation, Inc., Sep. 9, 2017.
Google Search: "PHP-Computer Programming Language," Retrieved on Sep. 11, 2017.
"Rootkit," https://en.wikipedia.org/wiki/Rootkit, Wikimedia Foundation, Inc., Aug. 10, 2017.
"Spyware," https://en.wikipedia.org/wiki/Spyware, Wikimedia Foundation, Inc., Aug. 8, 2017.
"The Go Programming Language," https://golang.org/, Retrieved on Sep. 11, 2017.
"Trojan Horse (computing)," https://en.wikipedia.org/w/index.php?titile=Trojan_horse_(computing)&oldid=795888851, Wikimedia Foundation, Inc., Aug. 17, 2017.
Google Search: "What is Golang." Retrieved on Sep. 11, 2017.
"Tyk Open Source API Gateway," https://tyk.io/, Retrieved on Sep. 11, 2017.

* cited by examiner

MULTIPLEXED—PROACTIVE RESILIENCY SYSTEM

FIELD OF TECHNOLOGY

This disclosure relates to machine learning. More specifically, this disclosure relates to using machine learning to heighten security within a networked environment.

BACKGROUND

Software that is designed to be harmful to a computer system or network may be known as malicious software or malware. Malicious software may come in various forms, such as computer worms, computer viruses, Trojan horses, spyware, adware, root kits, keystroke logging, and browser helper objects.

Computer worms may be a standalone malware computer program. The computer program may be designed to replicate itself and spread to other computers within a network.

Computer viruses may be a malicious segment of code. The malicious segment of code may be configured to insert itself into an existing computer program, data files or boot sector of the computer's hard drive, thereby maliciously modifying the host system.

Trojan horses may be also be known as Trojans. A Trojan may be a malicious computer program that misleads users as to its true intent. Trojans may be spread using social engineering—i.e., duping users into executing a malicious email attachment. Unlike computer viruses and worms, Trojans typically do not inject themselves into computer files or programs. Trojans may be used to exploit their host computers, and use their host computers as proxy servers in order to execute an attack on third-party computers.

Spyware may be software that gathers information about a first entity without the first entity's knowledge or consent. Spyware may send or sell the gathered information to a second entity without the first entity's consent.

Adware may also be known as advertising-supported software. Adware may include software that presents unwanted advertisements. The adware may appear in various forms, such as a pop-up window or an "unclosable window."

Rootkits may be a collection of malicious software. The collection of software may be designed to enable a remote accessor to access a computer, or sectors of a computer, that the remote accessor would otherwise be banned from accessing. Once the remote accessor has gained access to the computer, the remote accessor may maintain privileged access to the computer system without the computer user's knowledge. The remote accessor may utilize his access to the computer to perform various unauthorized functions, such as stealing passwords, credit card information and computing resources and manipulating APIs (application programming interfaces).

Keystroke logging, which may also be referred to as keylogging, or keyboard capturing, may include recording, or logging, the keys struck on a keyboard. Generally, the recording is executed without the keyboard user's knowledge. The recorded keystrokes may enable an unauthorized user to steal passwords and access other information which may contribute to identity theft.

Browser Helper Object, or BHOs, may be a library module designed for a web browser to provide added functionality. Examples of legitimate BHOs include the Adobe™ PDF document conversion toolbar and the Google™ search toolbar. The BHO API, used to create a BHO, exposes hooks that enable access to the document object model of the current page and that control navigation. An installed malware-based BHO may activate upon detecting a secure HTTP connection. The BHO may steal information during the user's secure connection with a secured website.

Conventionally, malicious software is difficult to uproot from within a networked environment. A networked environment may include many branches as well as many layers of both hardware and software. Although one branch or layer affected by the malicious software may be cleaned from the malicious software, many times, unfortunately, other affected branches or layers may include residual remains of the malicious software. The residual remains may cause damage to the network and/or generate malicious software, which may infiltrate the previously-cleaned branches and/or layers. Continuous cleaning without being able to destroy, and/or remove, the malicious software may strain the system's resources and eventually may completely collapse the network.

At times, a network may be required to be wiped clean—i.e., remove all data included in substantially all hardware and software components of the network. This process may cause an entity to lose substantially all of their data. Wiping a network clean may also require reinitializing the hardware and software elements. Therefore, reinstating the compatibility between the software and hardware elements may require lengthy reconfigurations.

Therefore, it is desirable to provide a machine-learning system that is configured to promptly detect the presence of malicious software within a networked environment, remove the malicious software from all affected branches and/or layers, retain most of the stored data within the network and retain compatibility between the software and hardware components included in the network.

SUMMARY OF THE DISCLOSURE

Methods and systems for machine-learned detection and removal of malicious software within a computer network are provided. The computer network may include at least one application. The application may include a plurality of software layers. The computer network may also include a plurality of components that touch the at least one application. The plurality of components may include software dependencies, software libraries, hardware dependencies, code segments, computer applications and any other suitable hardware and/or software that touches the application.

The method may include recording environment behavior for the application and the plurality of components. Environment behavior may be understood, for the purposes of this application, to mean the manner in which an application or component performs within a computer system.

The method may include generating a baseline dataset for the application and the plurality of components. The baseline dataset may be based on the recorded environment behavior. The baseline dataset may be stored within a trace data repository.

The method may include scheduling snapshots of the application. The snapshots may be scheduled based on the criticality of the application. For example, an application with a higher level of criticality may schedule snapshots more frequently than an application with a lower level of criticality.

The method may include taking joint snapshots of the application and the plurality of components according to the scheduling. In some embodiments, the snapshots of the application and the plurality of components may be taken substantially simultaneously.

The method may include storing the snapshots in a trace data repository. The method may also include monitoring the application and the plurality of components, using the stored snapshots, for any deviation from the environment behavior.

The method may include detecting a first deviation from the environment behavior in the application or plurality of components. The method may include taking a non-scheduled snapshot—i.e., outside of the scheduling—of the application and the plurality of components when the first deviation is detected. The first deviation may be transmitted as an alert to stakeholders associated with the application.

The method may include receiving a flag from one or more stakeholders relating to the first deviation. The flag may identify the first deviation as "intended" or "unwarranted."

The method may include detecting a second deviation in the environment behavior of the application or the plurality of components. The method may include identifying a second deviation within the application or plurality of components. The method may include identifying the second deviation as "intended" or "unwarranted" based on previously received flag information.

The method may include determining that the second deviation is "unwarranted" and therefore, is directed to malicious software. Upon determining that the second deviation is "unwarranted" the methodology may include reverting the application and the plurality of components back to a previous version of the application and the plurality of components, thereby removing the malicious software.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
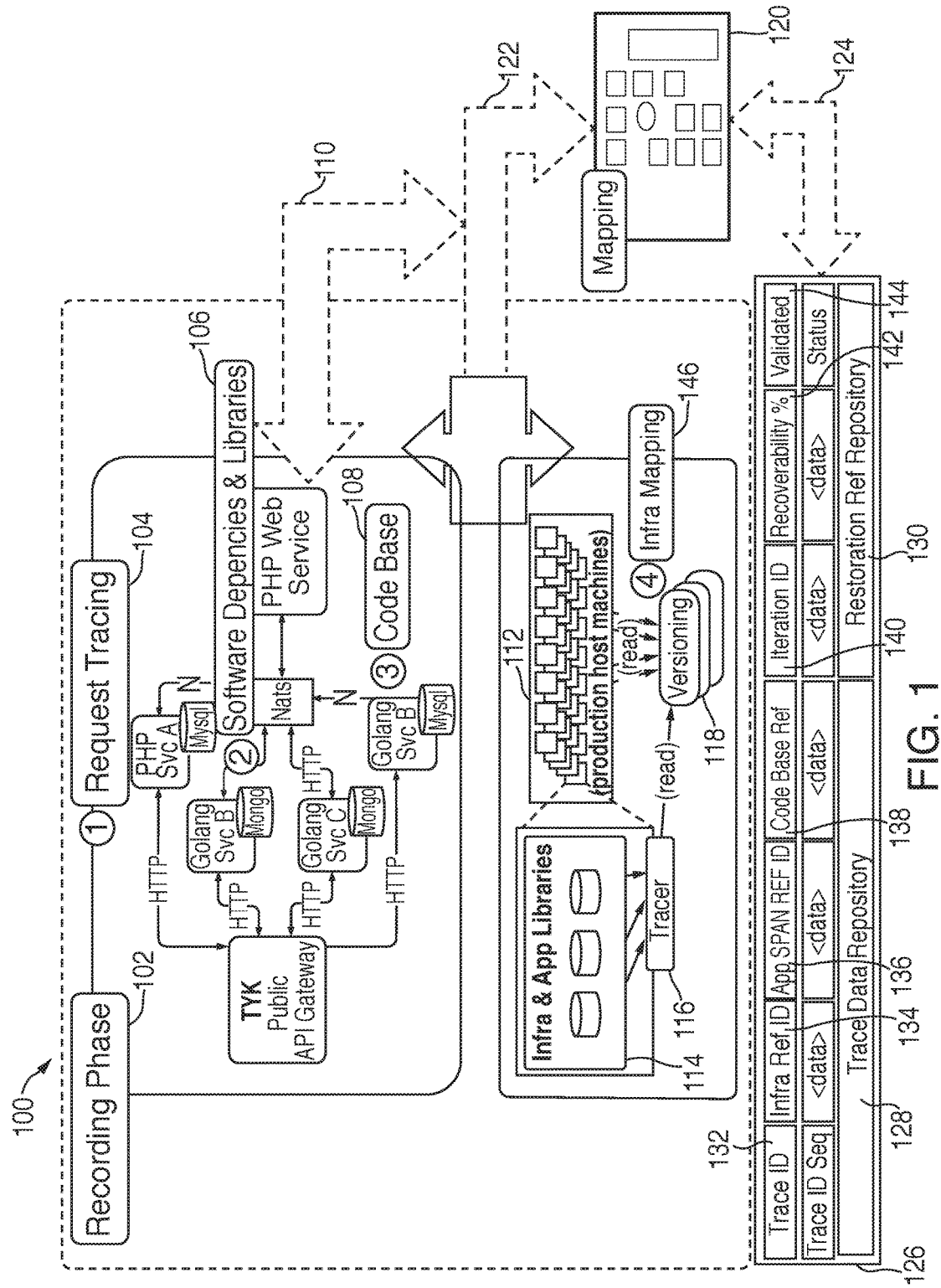
FIG. 1 shows an illustrative diagram in accordance with principles of the invention.

An apparatus for machine-learned detection and removal of malicious software within a network is provided. The apparatus may include a trace data repository. The trace data repository may receive recorded environment behavior. The environment behavior may relate to the behavior of components of the network. Components of the network may include an application and a plurality of components that touch the application.

The apparatus may include a processor. The processor may be configured to generate a baseline dataset. The baseline dataset may be based on the recorded environment behavior. The baseline dataset may include information relating to the typical behavior of one or more components within the network. In some embodiments, the baseline dataset may relate to the application and the plurality of components. In some embodiments, there may be a plurality of baseline datasets, wherein each dataset relates to a component or a group of components on the network.

The apparatus may include a scheduler. The scheduler may be configured to generate a schedule for taking substantially simultaneous snapshots of the application and the plurality of components. The number of iterations included in the generated schedule may be based, in whole or in part, on a level of criticality associated with the application.

The processor may be further configured to take simultaneous snapshots of the application and the plurality of components according to the schedule. The processor may be configured to store the snapshots in the trace data repository.

The processor may be configured to monitor the application and the plurality of components for any deviation in the environment behavior. The monitoring may be performed by continuously inspecting the stored snapshots.

At times, the processor may detect a deviation in the environment behavior of the application or in one of the plurality of components. When the deviation is detected, the processor may take a simultaneous snapshot, outside of the schedule, of the application and the plurality of components.

The processor may determine, based on previously recorded snapshots, whether the deviation is "intended" or "unwarranted." In some embodiments, a log of previously-verified "intended" deviations and "unwarranted" deviations may be maintained. In these embodiments, the processor may determine a similarity between the currently-detected deviation and a previously verified deviation. The processor may determine whether the deviation is "intended" or "unwarranted" based on the similar previously verified deviation. The processor may also determine whether the deviation is "intended" or "unwarranted" based on a level of similarity between the currently detected deviation and the previously verified deviation.

The processor may determine that the deviation is unwarranted and is caused by malicious software. Upon determination that the deviation is "unwarranted" the processor may be configured to revert the application and the plurality of components to a previous version of the application and the plurality of components. Reverting the application and the plurality of components to a previous version may remove the malicious software. The previous version of the application and the plurality of components may be the most recent snapshot, prior to the deviation, of the application and the plurality of components.

In some embodiments, the stored snapshots may be used to identify issues, and their causes, associated with the application and/or the plurality of components.

In some embodiments, the stored snapshots may be used to enhance the performance of a transmitted new application. An engine may learn from the recorded environment behavior to simulate at least one new application. The engine may determine, based on the simulation, a suitable set of tools, components, code routines and/or environment for hosting the new application.

In some embodiments, the stored snapshots may be used to identify and determine a security breach exposure metric of an environment. The environment may include the application and the plurality of components. The security breach exposure metric may correspond to the sum of a security breach exposure metric of each of the plurality of components. The security breach exposure metric may correspond to an average of a security breach exposure metric of each of the plurality of components. Any suitable method for computing the security breach exposure metric may be used.

In some embodiments, the stored snapshots may be used to appropriately allocate resources within the network.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram 100. Illustrative diagram 100 may show a system for recording, storing and reverting-back an application and plurality of components. Illustrative diagram 100 may include recording phase 102. Recording phase 102 may include a request to initiate tracing of an exemplary application, as shown at 104. Tracing an application may include taking and storing snapshots of the application. The application may or may not be included in a networked environment.

Upon receipt of the request for tracing the exemplary application, the system may allocate memory in trace data repository 128 for the tracing of the exemplary application. As shown at 106, the system may determine substantially all software dependencies and libraries that communicate with, or are touched by, the exemplary application. Additionally, the system may determine substantially all software layers included in, or touched by, the exemplary application. The system may also determine substantially all hardware dependencies that communicate with, or are touched by, the exemplary application.

Software dependencies and libraries 106 may include a TYK™ public API gateway, PHP services, Golang™ services, Mongo databases, Nats ("network address translation") remapping methods, MySQL relational database management systems and any other suitable software dependencies and libraries. TYK™ public API gateway may be an open source API ("Application programming interface") gateway associated with an API management platform. PHP services may be services written from the PHP programming language. PHP may be a server-side scripting language designed for web development. Golang™ services may be services written from the Golang™ programming language. Nats remapping methods may be methods of remapping one IP ("internet protocol") address space into another IP address space by modifying network address information in packet headers while the headers are in transit across a traffic routing device. MySQL may be an open source relational database management system based on SQL ("structured query language").

The system may identify each of the software layers, each of the software dependencies, each of the libraries and each of the hardware dependencies using a unique identifier. The unique identifiers of each of the dependencies may be combined into application span reference identification 136. The software dependencies may be transmitted to mapping module 120 via communication lines 110 and 122.

Mapping module 120 may map, using communication line 124, the software dependencies, the libraries and the hardware dependencies to trace data repository 128 located within repository 126. Each application may include a trace identification 132, an infra reference identification 134, an application span reference identification 136 and a code base reference identification 138.

Trace identification 132 may include an identification sequence for the exemplary application.

Infra reference identification 134 may include the components on which the exemplary application is resident. The infra reference identification includes the nomenclature of the environment setup at the snapshot—i.e., the given point in time. When a snapshot is taken, the infrastructure setup at that point in time includes all of the components which represent the end to end hardware and the software and libraries involved in the computations at the time of the snapshot. These components may vary with every change that occurs to one of the components. A new snapshot may include the changed components.

Application span reference identification 136 may include a combination of components that the application touches and the order in which the application touches those components. For example, an application span reference identification may include a sequence of dependencies such as, Server X, Platform H, Hardware W and Platform H.

The system may also determine a code base, as shown at 108. The code base may be the basis for the functioning of the exemplary application. Code base reference 138 may include a static reference to a deployed piece of code. The deployed piece of code may be included in the code base.

Infra and app libraries 114 may communicate with production host machines 112 and tracer 116. Versioning module 118 may retrieve snapshot information from production host machines 112 and tracer 116. The snapshot information may include snapshots of substantially all of the components associated with the exemplary application. The snapshot information may be stored in versioning module 118.

Infra mapping 146 may include determining the software layers within an application. Infra mapping 146 may also include determining software and/or hardware layers on which an exemplary application is resident. The information retrieved from infra mapping 146 may be used in conjunction with tracer 116 and production host machines 112 in order to determine the layers associated with the exemplary application.

Restoration reference repository 130 may be included in repository 126. Restoration reference repository 130 may be a repository for determining how confident the system is that it is able to restore the exemplary application and components back to working order. Restoration reference repository 130 may simulate a recovery in order to determine the confidence level of a complete trace back.

Restoration reference repository 130 may include, for each trace identification 132, iteration identification 140, recoverability metric 142 and validated status 144. Iteration identification 140 may be a unique identifier that identifies a snapshot iteration. Recoverability metric 142 may be a level of confidence that the system can recover the exemplary application and the components to the identified iteration snapshot. Validated status 144 may be a status of whether the recoverability metric has been validated.

Figure 2:
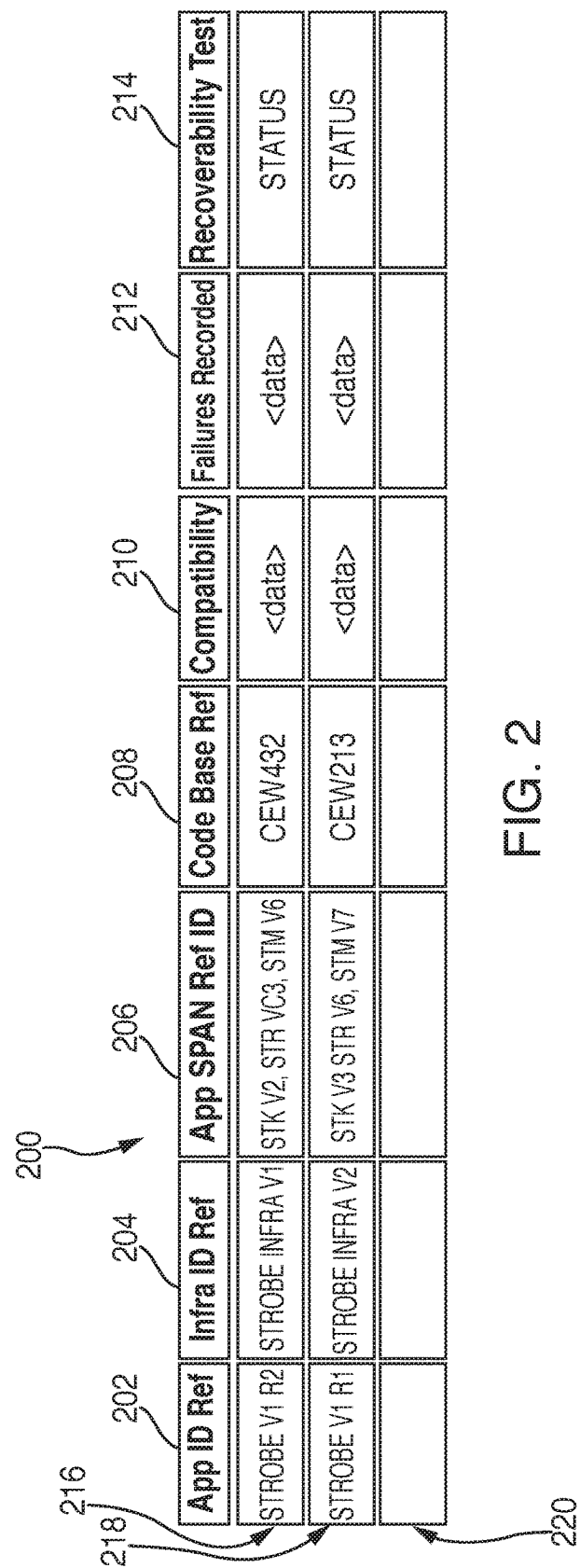
FIG. 2 shows another illustrative diagram in accordance with principles of the invention.

FIG. 2 shows an embodiment of repository 200. Repository 200 may be divided into two sub repositories—trace data repository and restoration reference repository. Trace data repository may include application identification reference 202, infra identification reference 204, application span reference identification 206 and code base reference 208. Restoration reference repository may include compatibility 210, failures recorded 212 and recoverability test 214.

Application identification reference 202 may include a reference to an application. Line 216 may classify an application. The application identification reference shown in line 216 may be strobe V1 R2. Strobe V1 R2 may identify the classified application.

Infra identification reference 204 may include a reference to the servers, platforms and hardware on which the application identified is resident. Line 216 may identify strobe infra V1 as the infra identification reference.

Application span reference identification 206 may include a composition of unique identifiers of substantially all components that touch the identified application. The sequence of the application span reference identification may be a sequence in which the application touches the components. Line 216 may identify the application span reference identification as STK V2, STR VC3, STM V6.

Code base reference 208 may include a static reference to a deployed piece of code associated with the identified application. The code base reference identified for line 216 may be CEW432.

Compatibility 210 may include the ability of the system to restore the environment back from the snapshots. Compatibility 210 may also include an ability to simulate the workability of the snapshots. The system may also simulate the functionality of the entire environment without actually restoring the environment. Compatibility 210 may be included in the restoration reference repository. It should be appreciated that the restoration reference repository may operate in tandem with the trace data repository, and therefore, a record in the trace data repository may correspond to one or more records in the restoration reference repository.

Failures recorded 212 may include a metric for failures that have been recorded for the identified application. Failures recorded 212 may be included in the restoration reference repository.

Recoverability test 214 may include a status for recoverability of the identified application. If the recoverability test shows a verified status, the identified application may be recoverable. If the recoverability test shows an unverified status, the identified application may be currently unrecoverable. Recoverability test 214 may be included in the restoration reference repository.

Line 218 shows another database unit for an exemplary application. Line 220 shows an empty database unit. Line 220 may be filled with data relating to another exemplary application.

Figure 3:
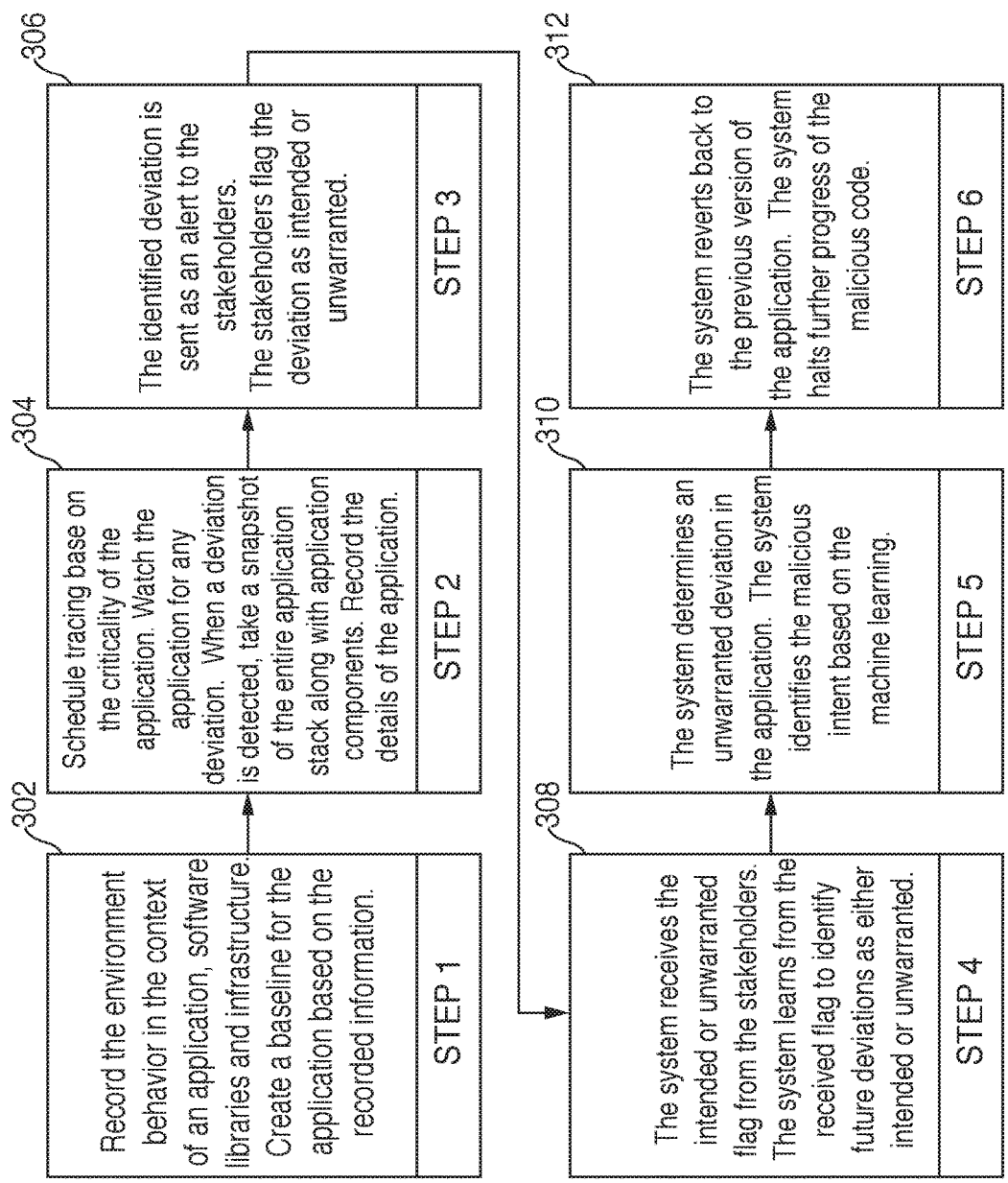
FIG. 3 shows an illustrative flow chart in accordance with principles of the invention.

FIG. 3 shows a flow chart. The flow chart may include steps. Step 1, shown at 302, may include recording the environment behavior in the context of an application, software libraries and infrastructure. Step 1 may also include creating a baseline for the application based on the recorded information.

Step 2, shown at 304, may include scheduling tracing based on the criticality of the application. Step 2 may also include monitoring the application for any deviation. Step 2 may also include, when a deviation is detected, taking a snapshot of the entire application stack along with application components. Step 2 may also include recording the details of the application.

At step 3, shown at 306, the identified deviation may be sent as an alert to the stakeholders. The stakeholders may flag the deviation as intended or unwarranted.

Step 4, shown at 308, may include the system receiving the intended or unwarranted flag from the stakeholders. The system may learn from the received flag to identify future deviations as either intended or unwarranted.

Step 5, shown at 310, may include the system determining an unwarranted deviation in the application. The system may identify the malicious intent based on the machine learning.

Step 6, shown at 312, may revert back to the previous version of the application. By reverting back to the previous version, the system may halt further progress of the malicious code.

Thus, systems and methods for a multiplexed-proactive resiliency system have been provided. Persons skilled in the art will appreciate that the present invention can be practiced by other than the described embodiments, which are presented for purposes of illustration rather than of limitation. The present invention is limited only by the claims that follow.

What is claimed is:

1. A method for machine-learned detection and removal of malicious software within a network, the method comprising:
   recording, within a trace data repository, environment behavior of:
     a network application; and
     a plurality of network components that communicate with the application;
   based on the recorded environment behavior, generating a baseline dataset within the trace data repository,
   scheduling a plurality of snapshots of the application, each of the snapshots occurring at a predetermined periodic interval;
   capturing a first snapshot of the application and the plurality of components, the first snapshot corresponding to one of the plurality of scheduled snapshots;
   storing the first snapshot in the trace data repository;
   monitoring the application and the plurality of components, using the stored snapshots and the baseline dataset, for any deviation in the environment behavior;
   detecting a first deviation in the environment behavior of the application or the plurality of components;
   in response to detecting a first deviation, capturing a second snapshot of the application and the plurality of components, the second snapshot being inconsistent with the plurality of scheduled snapshots;
   transmitting the second snapshot as an alert to one or more stakeholders associated with the application;
   receiving a flag from the one or more stakeholders relating to the first deviation, the flag identifying the first deviation as intended or unwarranted;
   detecting a second deviation included in the application or the plurality of components;
   identifying a second deviation as intended or unwarranted based on the received flag;
   upon determining that the second deviation is unwarranted, and, therefore, is directed to malicious software, reverting the application and the plurality of components back to a previous version of the application and the plurality of components, thereby removing the malicious software; and upon determining that the second deviation is intended, storing the intended deviation in a log of verified intended deviations.

2. The method of claim 1, wherein the scheduling is based on a level of criticality associated with the application.

3. The method of claim 1, wherein the previous version of the application and the plurality of components is the most recent snapshot, prior to the second deviation, of the application and the plurality of components.

4. The method of claim 1, wherein the stored snapshots are used to identify issues and their causes, associated with the application and the plurality of components.

5. The method of claim 1, wherein the stored snapshots are used to enhance the performance of a transmitted new application, such that an engine learns from the recorded environment behavior to simulate at least one new application and determine a suitable set of tools, components, code routines and/or environment for hosting the new application.

6. The method of claim 1, wherein the stored snapshots are used to identify and determine a composite security breach exposure metric of an environment, said environment that includes the application and the plurality of components, said composite security breach exposure metric corresponding to the sum of a plurality of security breach exposure metrics, each security breach exposure metric corresponding to one of the plurality components.

7. The method of claim 1, wherein the stored snapshots are used to appropriately allocate resources within the network.

8. An apparatus for machine-learned detection and removal of malicious software within a network, the apparatus comprising:
a trace data repository, the trace data repository configured to:
receive recorded environment behavior of:
a network application; and
a plurality of network components that communicate with the application;
a processor configured to:
generate a baseline dataset based on the recorded environment behavior; and
store the baseline dataset in the trace data repository;
a hardware-processor-scheduler configured to generate a schedule for capturing a plurality of substantially simultaneous snapshots of the application and the plurality of components at a plurality of predetermined periodic intervals; the processor further configured to:
capture a plurality of simultaneous snapshots of the application and the plurality of components according to the schedule;
store the plurality of captured snapshots in the trace data repository;
monitor, using the stored snapshots and the baseline dataset, the application and the plurality of components, for any deviation in the environment behavior of the application or the plurality of components;
detect a deviation in the environment behavior of the application or in at least one of the plurality of components;
in response to detecting the deviation, capture a second simultaneous snapshot of the application and the plurality of components, the second simultaneous snapshot being inconsistent with the schedule;
determine, based on previously recorded snapshots, whether the deviation is intended or unwarranted;
upon determination that the deviation is unwarranted and, therefore, is caused by malicious software, revert the application and the plurality of components to a previous version of the application and the plurality of components, thereby removing the malicious software; and
upon determination that the deviation is intended, storing the intended deviation in a log of verified intended deviations.

9. The apparatus of claim 8, wherein the scheduler generates the schedule based on a level of criticality associated with the application.

10. The apparatus of claim 8, wherein the previous version of the application and the plurality of components is the most recent snapshot, prior to the deviation, of the application and the plurality of components.

11. The apparatus of claim 8, wherein the stored snapshots are used to identify issues and their causes, associated with the application and the plurality of components.

12. The apparatus of claim 8, wherein the stored snapshots are used to enhance the performance of a transmitted new application, such that an engine learns from the recorded environment behavior to simulate at least one new application and determine a suitable set of tools, components, code routines and/or environment for hosting the new application.

13. The apparatus of claim 8, wherein the stored snapshots are used to identify and determine a composite security breach exposure metric of an environment, said environment that includes the application and the plurality of components, said composite security breach exposure metric corresponding to the sum of a plurality of composite security breach exposure metrics, each security breach exposure metric corresponding to one of the plurality of components.

14. The apparatus of claim 8, wherein the stored snapshots are used to appropriately allocate resources within the network.

15. A method for machine-learned detection and removal of malicious software within a network, the method comprising:
recording, within a trace data repository, environment behavior of:
a network application; and
a plurality of network components that communicate with the application;
based on the recorded environment behavior, generating a baseline dataset within the trace data repository;
scheduling a plurality of snapshots of the application, each of the snapshots occurring at a predetermined periodic interval;
capturing a first snapshot of the application and the plurality of components, the first snapshot corresponding to one of the plurality of scheduled snapshots;
storing the first snapshot and data associated with the first snapshot in the trace data repository, said data comprising:
a trace identification sequence identifying the application;
an infra reference identifier identifying an environment setup of the application at the time of the first snapshot;
an application span reference identifier identifying the plurality of components that communicate with the application at the time of the first snapshot;
a code reference identifying a static reference to a deployed piece of code, said deployed piece of code being the basis for functioning of the application;
performing a simulated restoration of the application and the plurality of components back to the first snapshot;

based on the simulated restoration, determining a confidence level for recovering the application and the plurality of components;

storing, in a restoration reference repository:
- an iteration identifier identifying the first snapshot;
- a recoverability metric identifying the confidence level;
- a validated status identifying whether the recoverability metric has been validated;

monitoring the application and the plurality of components, using the trace data repository, for any deviation in the environment behavior;

detecting a deviation in the environment behavior of the application of the plurality of components;

in response to detecting the deviation, receiving a flag relating to the deviation;

based on the received flag, identifying the deviation as intended or unwarranted;

determining that the deviation is unwarranted and, therefore, is directed to malicious software;

upon determining that the deviation is unwarranted, reverting the application and the plurality of components back to a previous version of the application and the plurality of components, thereby removing the malicious software, said previous version being the most recent snapshot in which the recoverability metric is above a predetermined figure; and upon determining that the deviation is intended, storing the intended deviation in a log of verified intended deviations.

16. The method of claim 15, wherein the scheduling is based on a level of criticality associated with the application.

17. The method of claim 15, wherein the stored snapshots are used to identify issues and their causes, associated with the application and the plurality of components.

18. The method of claim 15, wherein the stored snapshots are used to enhance the performance of a transmitted new application, such that an engine learns from the recorded environment behavior to simulate at least one new application and determine a suitable set of tools, components, code routines and/or environment for hosting the new application.

19. The method of claim 15, wherein the stored snapshots are used to identify and determine a composite security breach exposure metric of an environment, said environment that includes the application and the plurality of components, said composite security breach exposure metric corresponding to the sum of a plurality of security breach exposure metrics, each security breach exposure metric corresponding to one of the plurality components.

20. The method of claim 15, wherein the stored snapshots are used to appropriately allocate resources within the network.

* * * * *